US011932046B2

(12) United States Patent
Ran et al.

(10) Patent No.: US 11,932,046 B2
(45) Date of Patent: *Mar. 19, 2024

(54) CLIP BOARD

(71) Applicant: The Stanley Works Israel Ltd., Rosh Ha'Ayin (IL)

(72) Inventors: Amit Ran, Mazkeret Batya (IL); Gilad Moisa, Hod HaSharon (IL); Sharon Bar-Erez, Gan Yehoshia (IL)

(73) Assignee: The Stanley Works Israel Ltd., Rosh Ha'Ayin (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/167,428

(22) Filed: Feb. 10, 2023

(65) Prior Publication Data

US 2023/0191827 A1 Jun. 22, 2023

Related U.S. Application Data

(63) Continuation of application No. 17/220,277, filed on Apr. 1, 2021, now Pat. No. 11,577,542.

(30) Foreign Application Priority Data

Apr. 7, 2020 (EP) .................................... 20168576

(51) Int. Cl.
*A47B 97/04* (2006.01)
*B42F 9/00* (2006.01)

(52) U.S. Cl.
CPC .............. *B42F 9/004* (2013.01); *B42F 9/005* (2013.01)

(58) Field of Classification Search
None
See application file for complete search history.

(56) References Cited

U.S. PATENT DOCUMENTS

| | | | | |
|---|---|---|---|---|
| 7,465,057 B2 * | 12/2008 | Sandy | B42F 9/004 | 362/109 |
| 9,827,807 B2 * | 11/2017 | Cooper | G06F 1/1628 | |
| 2003/0155762 A1 * | 8/2003 | Gaska | B42F 9/005 | 281/45 |
| 2008/0002394 A1 * | 1/2008 | Jones | B42F 9/004 | 362/154 |
| 2012/0292312 A1 * | 11/2012 | Chang | B42F 7/14 | 220/4.24 |
| 2015/0158324 A1 * | 6/2015 | Cooper | B42F 9/002 | 281/45 |
| 2019/0271433 A1 * | 9/2019 | Tonelli | A45C 5/03 | |

* cited by examiner

*Primary Examiner* — Elmito Breval
(74) *Attorney, Agent, or Firm* — Bruce S. Shapiro

(57) ABSTRACT

The present invention relates to a clipboard having a frontal surface, a clamping mechanism, a dorsal surface, and a latch engagement portion configured to engage a mating latch and secure the clipboard to a surface of a secondary container.

9 Claims, 10 Drawing Sheets

CLIP BOARD

CROSS-REFERENCE TO RELATED APPLICATIONS

This application is a continuation of U.S. patent application Ser. No. 17/220,277 filed Apr. 1, 2021, which claims priority under 35 U.S.C. § 119, to EP Patent Application No. 20168576.5 filed Apr. 7, 2020. The contents of each are incorporated herein by reference in their entireties.

FIELD OF THE INVENTION

The invention relates a clipboard. More specifically, the invention relates to a clipboard configured to securely latch to a secondary container such as a toolbox.

STATE OF THE ART

Clipboards are useful for providing portable writing surfaces. The use of clipboards in a variety of different business, industrial and institutional applications is well known. For example, sports coaches use clipboards to quickly draw up plays and share them with her team.

In a construction setting, a clipboard may be used by a contractor to take notes on a project or create an invoice. As such, when traveling to and from a construction site, a contractor may desire to carry a clipboard along with all of his other tools and accessories. Although clipboards are portable, they may become cumbersome when they are transported with a contractor's tools and accessories. In these instances, the contractor has to either carry the clipboard by hand; stored in a separate briefcase/backpack; or within his toolbox, which limits space for necessary tools.

it would be useful to have a clipboard that is designed to be selectively connectable to an exterior surface of a secondary container such as a toolbox. Such a clipboard would overcome one or more of the aforementioned drawbacks.

SUMMARY OF THE INVENTION

A goal of the invention is to provide a clipboard that is selectively connectable to an exterior surface of a secondary container or toolbox.

It is therefore proposed a clipboard according to claim 1.

DESCRIPTION OF THE FIGURES

Further details, features and advantages of the invention are explained in more detail below with the aid of the exemplary embodiments of the invention that are illustrated in the figures in which.

DETAILED DESCRIPTION OF AT LEAST ONE EMBODIMENT

Figure 1:
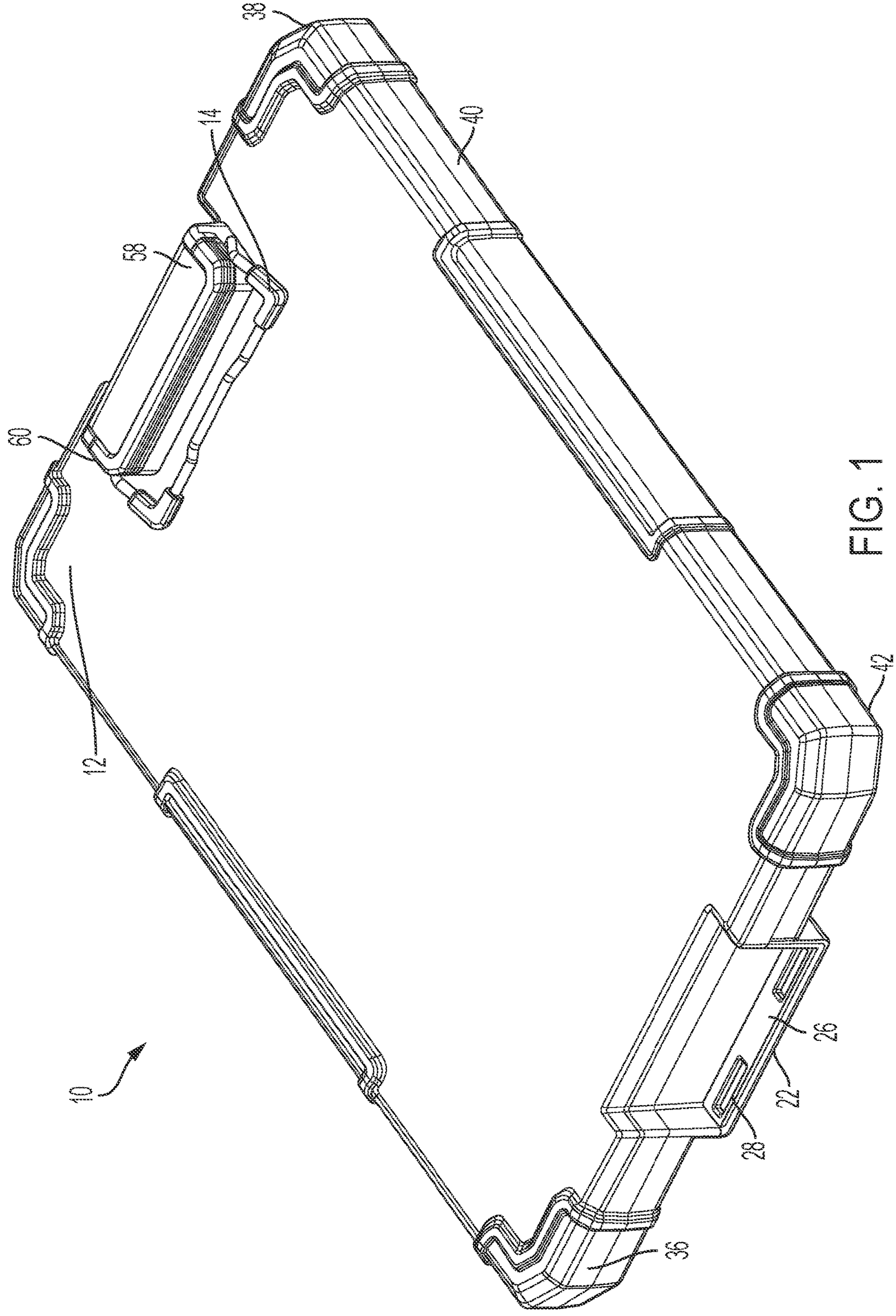
FIG. 1 is a top perspective view of a clipboard according to the invention.
Figure 2:
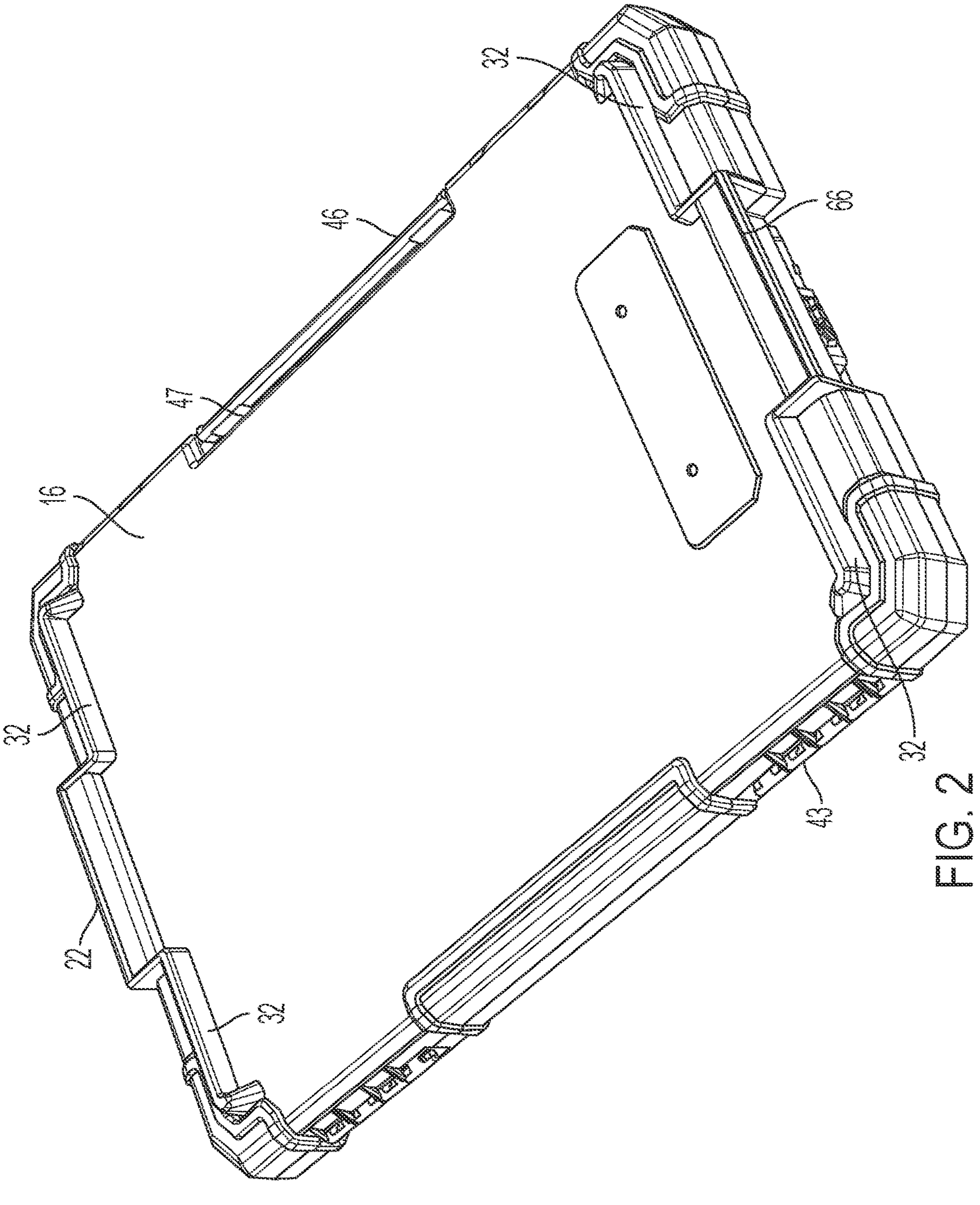
FIG. 2 is a bottom perspective of the clipboard.
Figure 3:
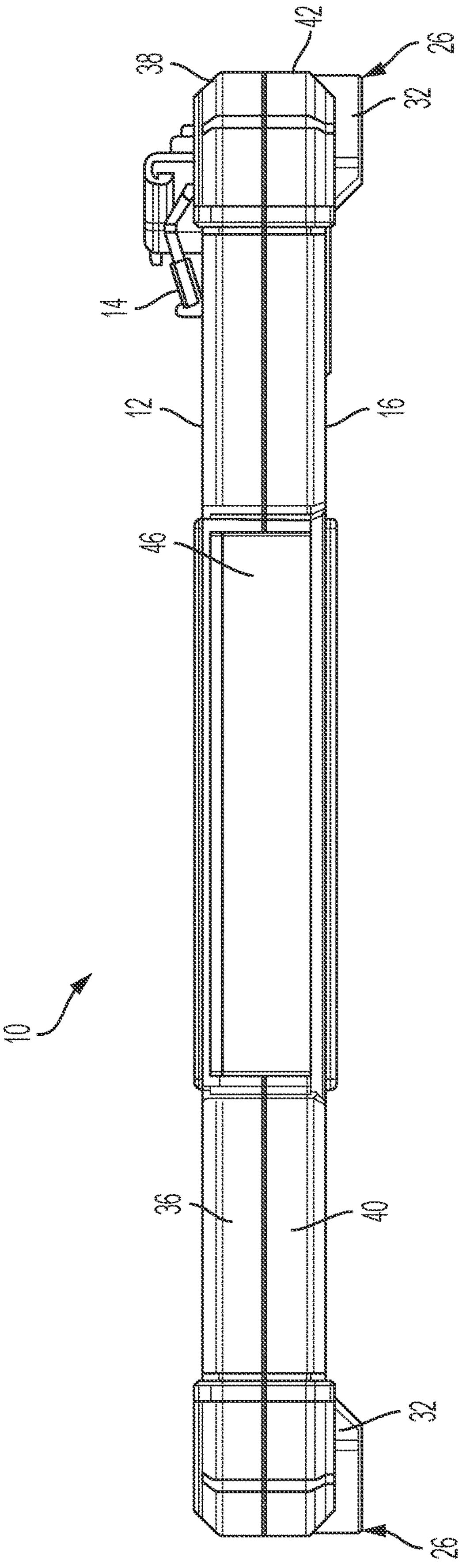
FIG. 3 is a side elevational view of the clipboard.

FIGS. 1-3 illustrate a clipboard 10 having a frontal surface 12 that is configured to support a writing medium such a paper. The frontal surface 12 may include a surface that is configured to receive dry erase markers. The frontal surface 12 may also include a clamping mechanism 14 that is configured to secure a writing medium to the frontal surface 12. Such a clamping mechanism 14 may include a spring biased metal hinge. The clipboard further includes a dorsal surface 16 opposite the frontal surface 12. The clipboard 10 also includes a latch engagement portion 22 that is characterized to engage a mating latch 24 and secure the clipboard 10 to a surface 18 of a secondary container 20.

The latch engaging portion 22 includes a lip 26 having one or more depressions 28. Depressions 28 are configured to receive a hook 30 of a mating latch 24. (See FIGS. 5 and 6.) As best seen in FIG. 3, in a preferred embodiment, the latch engaging portion 22 is positioned on a plane that is separate and distal from the dorsal surface 16. The dorsal surface 16 may further include one or more protrusions 32. Protrusions 32 are configured to engage corresponding recesses in the surface 18 of the secondary container 20. When the protrusions 32 are engaged to the corresponding recesses, axial movement of the clipboard is limited.

In an embodiment, the frontal surface 12 includes a series of outer walls 36 that are substantially perpendicular thereto. The frontal surface 12 and outer walls 36 form an upper clam 38. Similarly, the dorsal surface 16 may also include a series of outer walls 40 that are substantially perpendicular thereto. The dorsal surface 16 and the outer walls 40 form a lower clam 42. The upper clam 38 and lower clam 42 may be hinged to one another by hinge 43. The upper clam 38 and lower clam 42 may be selectively moved between a closed position and an open position. In the closed position, access to an interior space 44 between the upper clam 38 and lower clam 42 is limited. As seen in FIG. 4, in the open position, access to the interior space 44 is not limited.

Figure 4A:
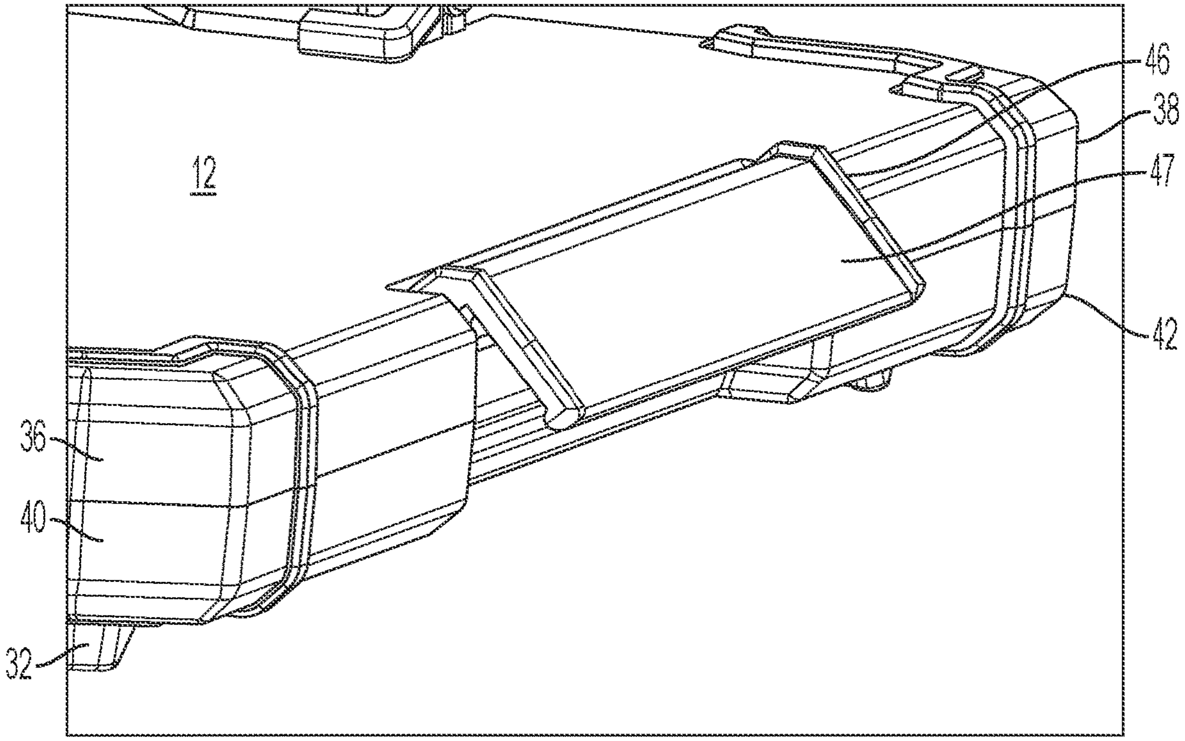
FIG. 4*a* is a detailed view of the closing mechanism of the clipboard
Figure 4B:
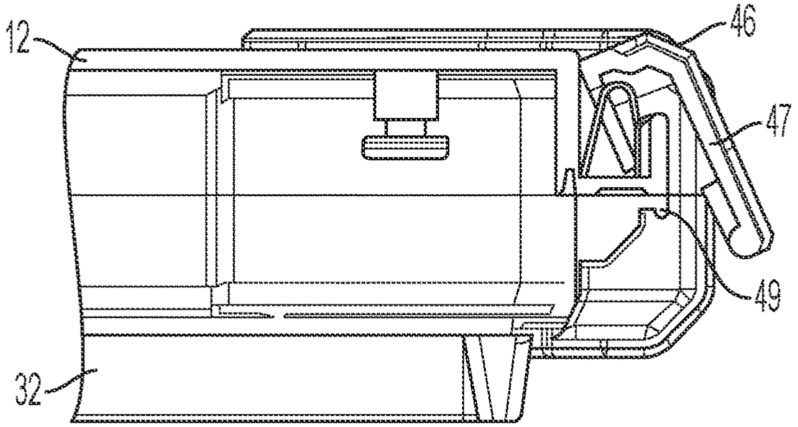
FIG. 4*b* is a cutaway view of the closing mechanism of the clipboard

The clipboard may further include a closing mechanism 46 configured to selectively secure the upper clam 38 ad lower clam 42 in their closed position. As shown in FIGS. 3, 4*a* and 4*b*, the closing mechanism 46 may include a clasp 47 configured to engage lip 49. Those skilled in the art will recognize that the effect of selectively providing access to the interior space 44 may be achieved by a closing mechanism with a variety of different configurations. Any of those configurations may be employed with this invention without departing from the scope herein.

Figure 5:
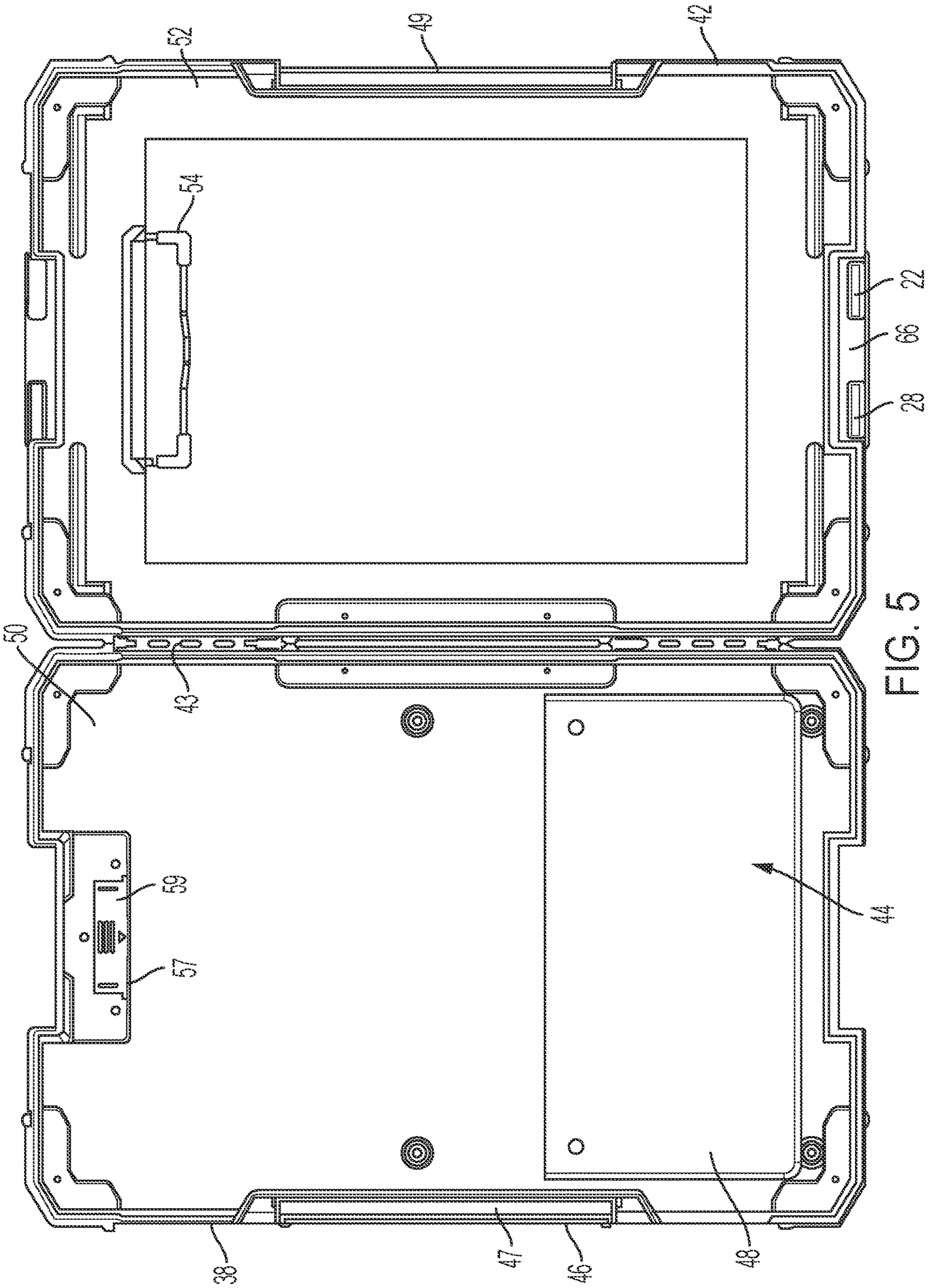
FIG. 5 is a top plan view of the clipboard in its open configuration.

As shown in FIG. 5, the clipboard 10 may further include a pocket 48 disposed within the interior space 44. The pocket 48 may be disposed on either the interior surface 50 of the upper clam 38 or the interior surface 52 of the lower clam 42. The pocket 48 is configured to receive and secure documents therein. In addition to a pocket 48, the interior space 44 may also include a second clamping mechanism 54. As with the clamping mechanism 14 that is configured to secure papers to the frontal surface 12, the second clamping mechanism 54 is configured to secure papers to an interior surface 50, 52 of either the upper clam or lower clam 42. Although FIG. 4 shows the pocket 48 on the interior surface 50 of the upper clam 38 and the second clamping mechanism 54 on interior surface 52 of the lower clam 42, those skilled in the art will recognize that these can be configured and a variety of different configurations without departing from the scope of the invention.

Figure 9:
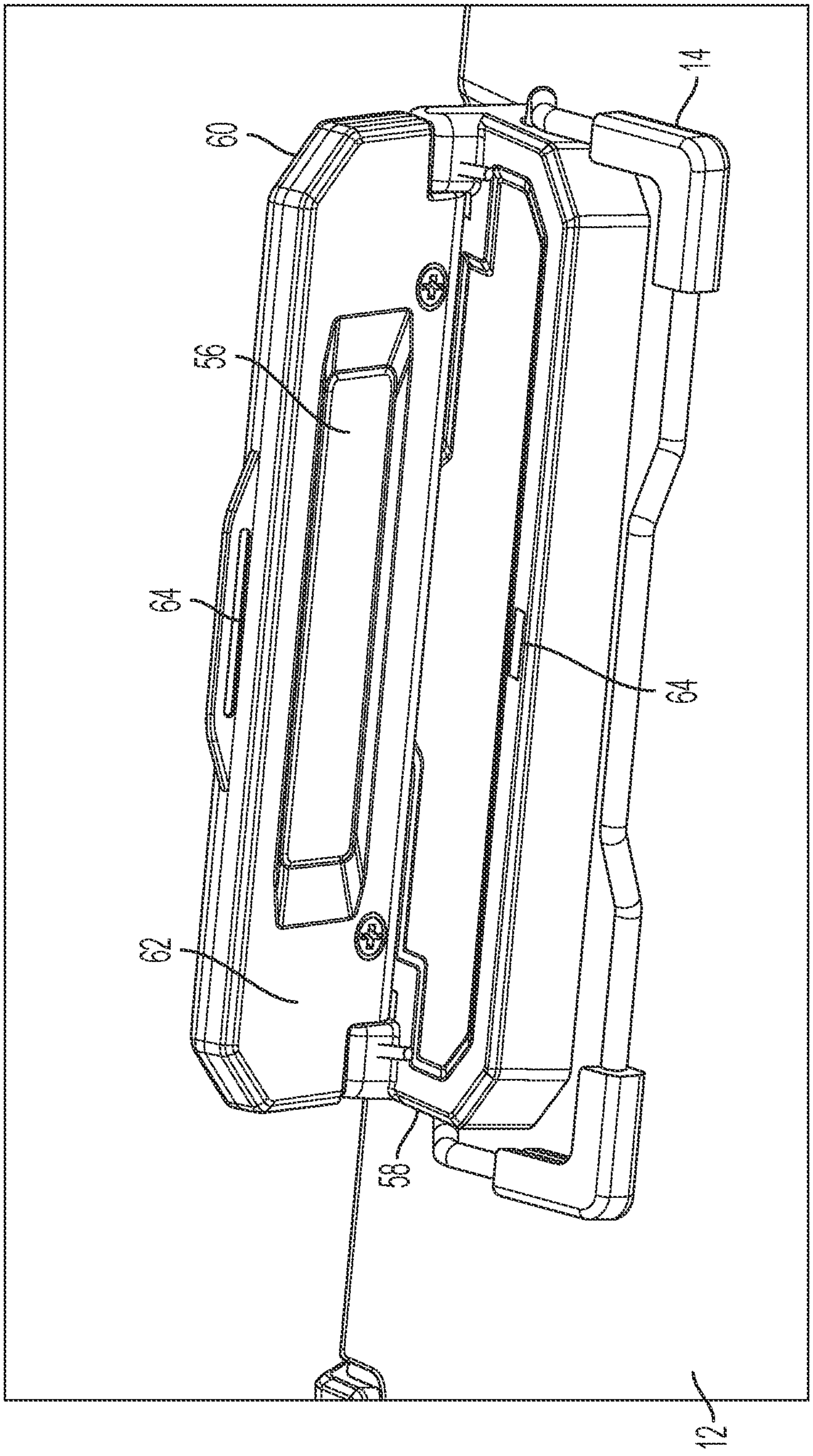
FIG. 9 is a detailed view of the illumination device of the clipboard
Figure 10:
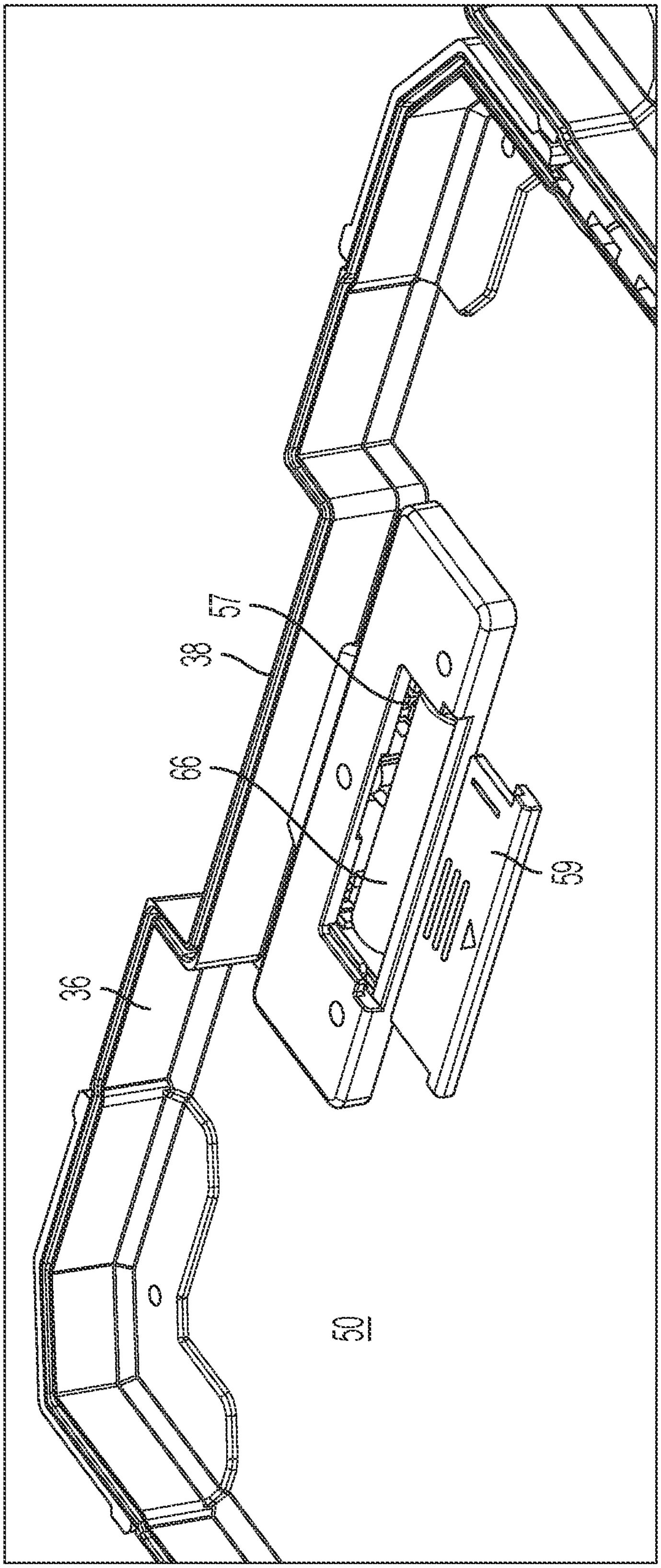
FIG. 10 is a detailed view of the battery compartment and its removable door.

As best seen in FIG. 9, Clipboard 10 may further include an illumination device 56. Illumination device 56 is configured to provide light and thereby facilitate reading or writing in low light situations. The power source for the illumination device may be disposed within a battery compartment 57 disposed within the interior space 44. See FIG. 10. Battery compartment 57 may include a removable door 59 to allow access thereto. The power source for the illumination device 56 may be a battery 66. Those skilled in the art will recognize that the illumination device 56 may be powered by a variety of different sources including a solar device.

The illumination device 56 may be positioned within a lighting compartment 58 on the frontal surface 12. Lighting compartment 58 may include a door 60 movable between a closed position and an open position. In a preferred embodiment, the illumination device 56 is positioned on an interior surface 62 of door 60. When the door is in its open position, the illumination device 56 provides light to the frontal surface 12, and when the door 60 is in its closed position, light from the illumination device 56 is obscured from reaching the frontal surface. Door 60 may be held in its closed position by magnets 64. In a preferred embodiment, the illumination device 56 may be powered on automatically, when magnets 64 are separated from one another

INDUSTRIAL APPLICABILITY

Figure 6:
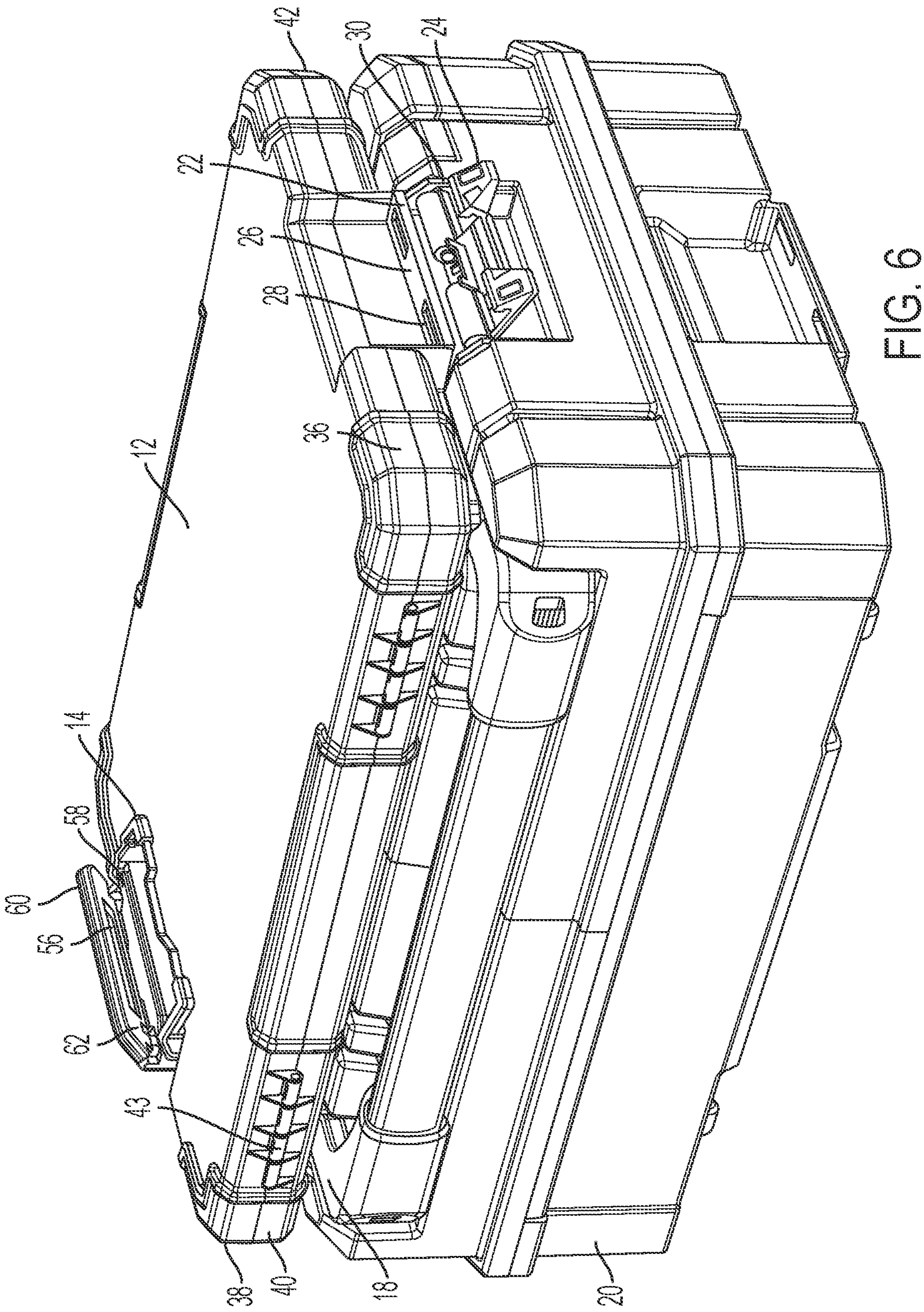
FIG. 6 is a perspective view of the clipboard in resting atop a secondary container or toolbox.

The operation of the clipboard 10 will now be explained. As shown in FIGS. 5 and 6, when an operator wishes to secure the clipboard 10 for stowing or transportation, she brings the dorsal surface 16 into contact with a surface 18 of a secondary container 20. In a preferred embodiment, the protrusions 32 that extend from the dorsal surface 16 may be brought into engagement with corresponding recesses in surface 18. When the protrusions 32 are engaged with recesses, axial movement of the clipboard 10 is limited.

Figure 7:
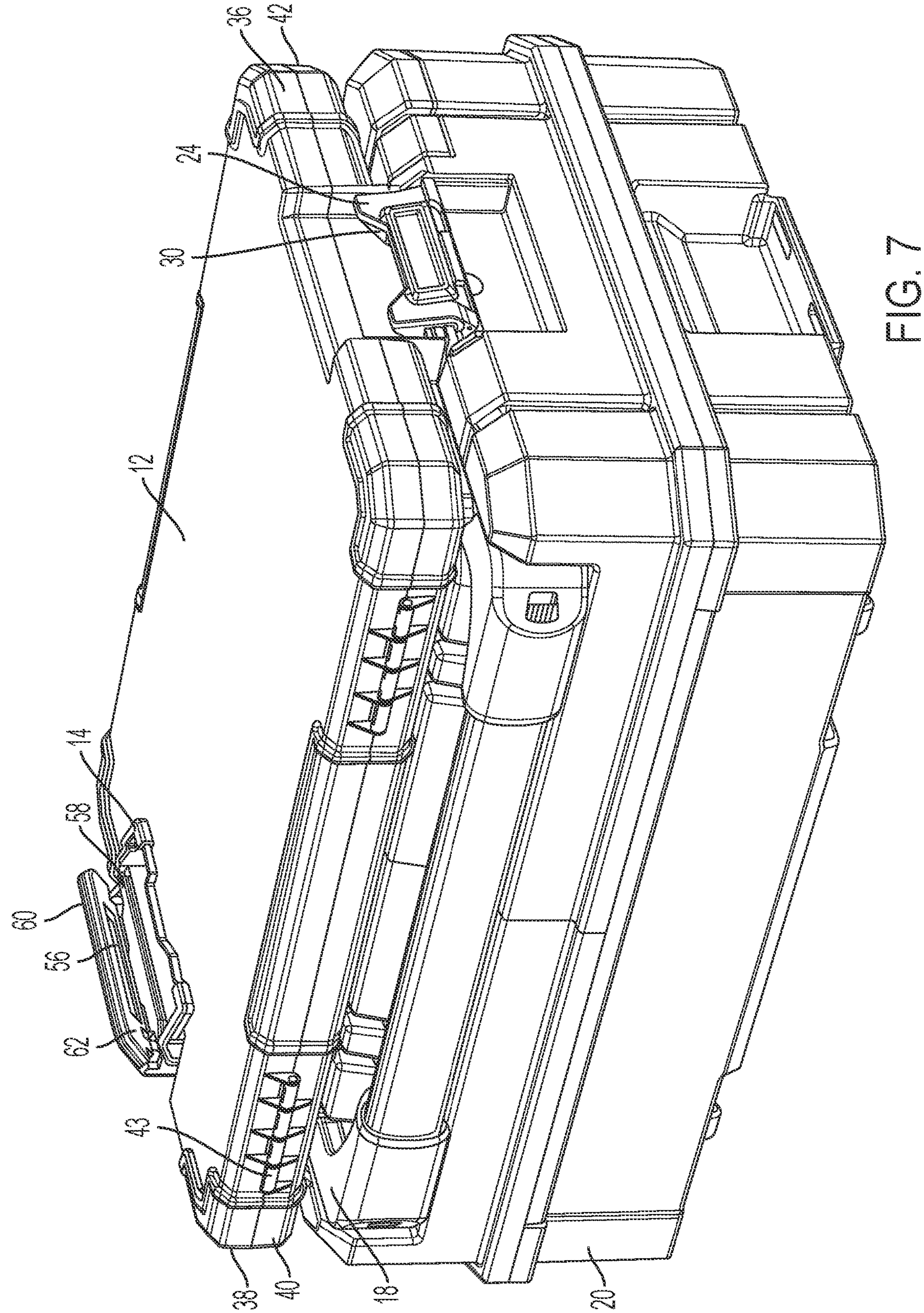
FIG. 7 is a perspective view of the clipboard securely latched to a secondary container or toolbox
Figure 8:
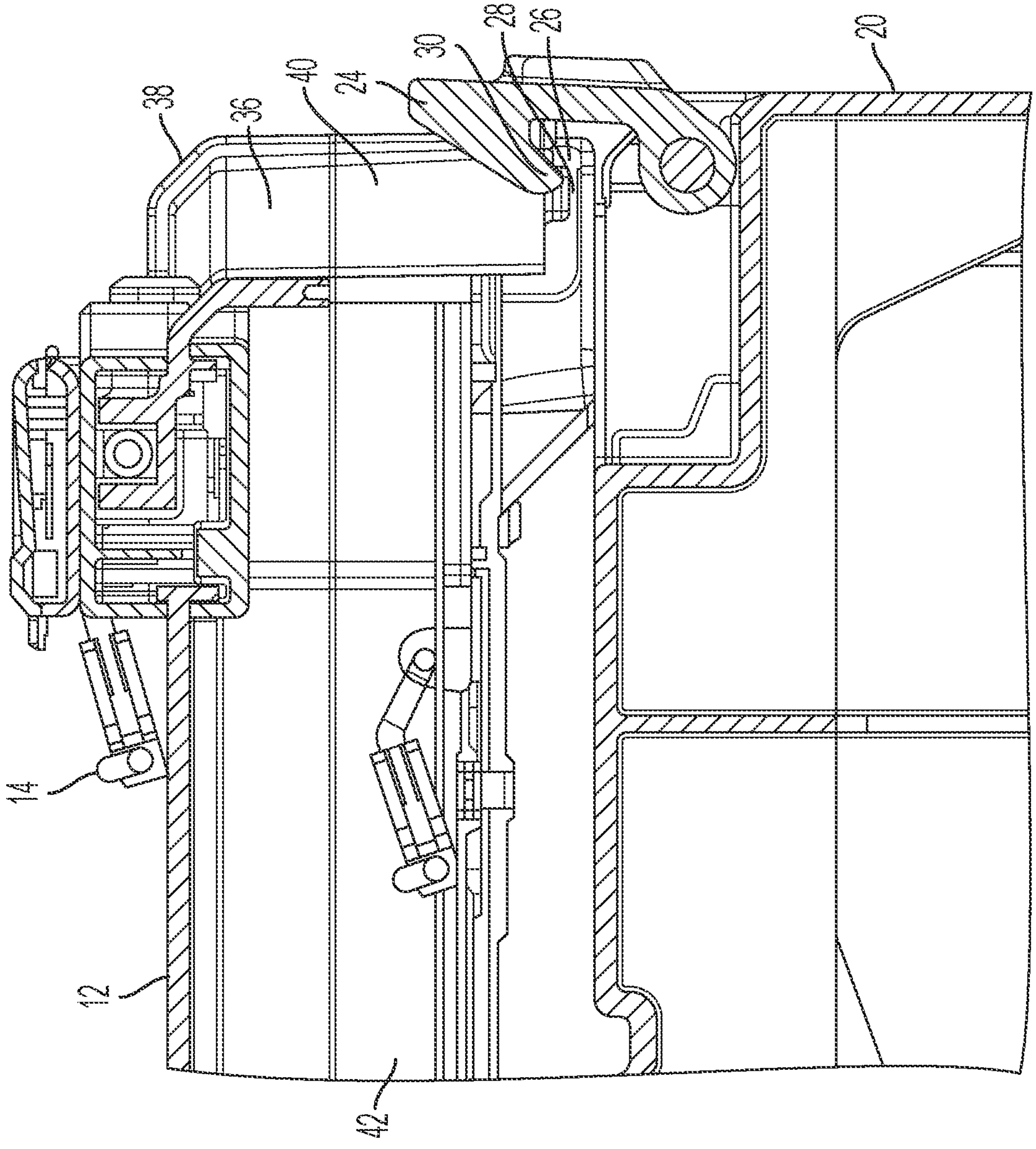
FIG. 8 is a detailed cutaway view showing the latch of the secondary container securing the clipboard to said container

After the clipboard 10 is positioned on the secondary container 20, the latch engagement portion 22 is in engaging proximity to the mating latch 24 of the secondary container. In order to secure the clipboard 10 to the secondary container 20, the mating latch 24 is moved into contact with the latch engagement portion 22. See FIGS. 7 and 8. In a preferred embodiment, the latch engagement portion 22 includes a lip 26 having one or more depressions 28. Depressions 28 are configured to receive a hook 30 of the mating latch 24. When an operator moves the latch 24 into contact with the lip 26 and applies force, the hook 30 of the latch 24 overcomes the lip 26 and comes to a rest in depression 28. Thus, the clipboard 10 is secured to the secondary container 20.

In a preferred embodiment, the clipboard 10 includes two latch engaging portions 22 that are spaced apart from one another. The two latch engaging portions 22 are configured to engage two mating latches 24 on the secondary container 20. By having two latch engaging portions 22, the clipboard 10 is more reliably secured to the secondary container 20.

The invention claimed is:

1. The combination of a clipboard and a storage container, said storage container comprising an upper surface having a latch disposed thereon; and said clipboard comprising:
a frontal surface configured to support a writing medium;
a dorsal surface opposite the frontal surface;
and a latch engagement portion; wherein,
said dorsal surface of said clipboard may be disposed on said upper surface of said storage container and secured thereto by engagement of said latch with said latch engagement portion.

2. The combination recited in claim 1, said clipboard further comprising a clamping mechanism configured to secure a writing medium to the frontal surface.

3. The combination recited in claim 2, said latch engagement portion comprising a lip having a depression formed therein, said latch comprising a hook; wherein,
said latch is rotatable from a first position in which said latch is not in contact with said lip and said clipboard is not secured to said storage container to a second position in which said latch is in contact with said lip with said hook disposed within said depression to secure said clipboard to said storage container.

4. The combination recited in claim 2, said dorsal surface further comprising protrusions, said upper surface comprising recesses, wherein, said protrusions are engaged in said recesses to limit axial movement of said clipboard relative to said storage container.

5. A clipboard comprising:
a frontal surface configured to support a writing medium and having a compartment formed therein;
a door having an interior surface and enclosing said compartment;
a clamping mechanism configured to secure a writing medium to the frontal surface;
a dorsal surface opposite the frontal surface; and
an illumination device disposed within said compartment, wherein, said illumination device is positioned on said interior surface of said door.

6. The clipboard recited in claim 5, wherein, said door is movable between an open position and a closed position, wherein in said open position, light from said illumination device can reach the frontal surface, and wherein in said closed position, light from said illumination device is obscured from reaching the frontal surface.

7. The clipboard recited in claim 6, wherein moving the door between its closed position and its open position engages a switch that selectively powers the illumination device.

8. The combination of a clipboard and a storage container, said storage container comprising an upper surface; and said clipboard comprising a frontal surface configured to support a writing medium and a dorsal surface opposite the frontal surface;
wherein, said combination further includes means for securing said clipboard to said storage container.

9. The combination recited in claim 8, wherein, when said clipboard is secured to said storage container said dorsal surface is disposed on said upper surface.

* * * * *